United States Patent [19]

Bosch et al.

[11] Patent Number: 4,683,055
[45] Date of Patent: Jul. 28, 1987

[54] FILTER FOR DIESEL FUEL

[75] Inventors: Franz-Ulrich Bosch, Stuttgart; Willi Müller, Sulz-Sigmarswangen; Hans Schacht; Max Straubel, both of Stuttgart, all of Fed. Rep. of Germany

[73] Assignee: Robert Bosch GmbH, Stuttgart, Fed. Rep. of Germany

[21] Appl. No.: 728,850

[22] Filed: Apr. 30, 1985

[30] Foreign Application Priority Data

Jun. 22, 1984 [DE] Fed. Rep. of Germany ....... 3422979

[51] Int. Cl.$^4$ .................. B01D 27/08; B01D 35/00
[52] U.S. Cl. .................. 210/120; 210/134; 210/136; 210/149
[58] Field of Search ............. 210/120, 136, 149, 184, 210/436, 134; 123/514, 516, 557, 510

[56] References Cited

U.S. PATENT DOCUMENTS

| | | | |
|---|---|---|---|
| 2,942,732 | 6/1960 | Edelen | 210/120 |
| 3,687,290 | 8/1972 | Myers | 210/149 |
| 4,454,848 | 6/1984 | Duprez | 123/557 |
| 4,478,197 | 10/1984 | Yasuhara et al. | 123/514 |
| 4,574,762 | 3/1986 | Müller et al. | 123/510 |

FOREIGN PATENT DOCUMENTS

| | | | |
|---|---|---|---|
| 3330057A1 | 3/1984 | Fed. Rep. of Germany. | |
| 2490733 | 3/1982 | France | 123/557 |
| 0046010 | 3/1980 | Japan | 123/510 |
| 0062353 | 4/1983 | Japan | 123/514 |
| 2028921 | 3/1980 | United Kingdom | 123/510 |
| 1584517 | 2/1981 | United Kingdom. | |

OTHER PUBLICATIONS

Translation of French Patent Publication No. 2,490,733, (Mar. 26, 1982; Fayard).

Primary Examiner—Richard V. Fisher
Assistant Examiner—Linda S. Evans
Attorney, Agent, or Firm—Michael J. Striker

[57] ABSTRACT

A diesel fuel filter, which is arranged in a conduit between a fuel tank and a fuel injection pump, comprises a housing accommodating a filter element and a cover non-releasably connected to the housing. A temperature-responsive switching device for switching fuel overflow quantities from the pump to the tank as well as a ventilation device are positioned in a chamber formed by a protruding formation of the cover and a flat plate connected to the housing. A plate shaped pressure control valve, which opens into a contaminated side of the filter element, connects that side to the chamber.

9 Claims, 4 Drawing Figures

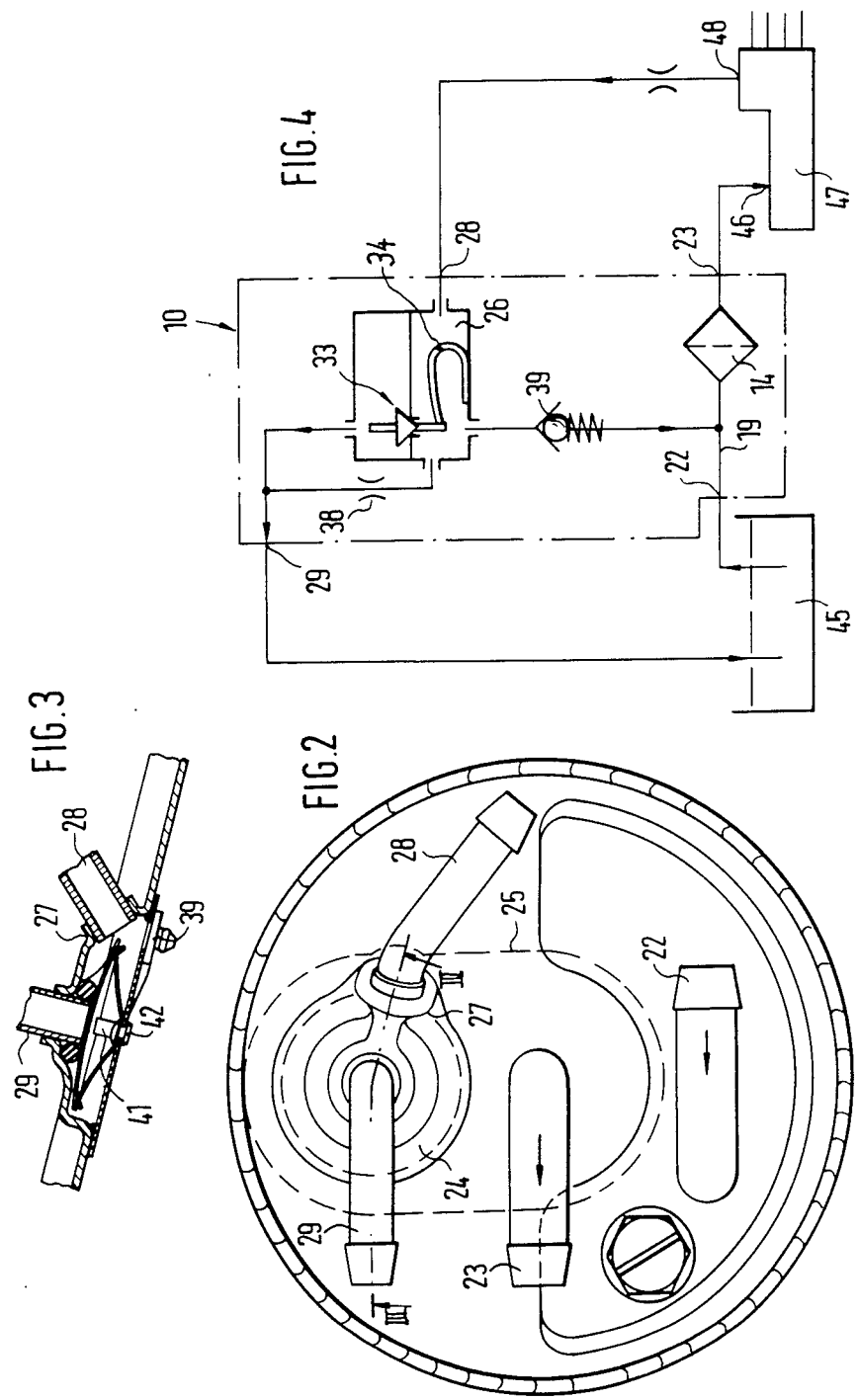

FILTER FOR DIESEL FUEL

BACKGROUND OF THE INVENTION

The present invention relates to a filter for diesel fuel which is normally interconnected between a feeding connection connected to a fuel containing tank and a discharge connection leading to a fuel injection pump.

The filter of the type under consideration is disclosed in DE-OS No. 3,330,057. This known filter is provided with a device for a temperature responsive switching of overflow fuel quantities of the fuel injection pump and also with a ventilation device for carrying off gases from the overflow quantities returned to the tank. The disadvantage of the known filter resides in that the filter is designed as a number of interchanged components in which if the filter element becomes contaminated the filter cartridge is removed from the cover, provided with fuel connections, and exchanged. Devices for temperature responsive switching and for the ventilation are accommodated in the cover which has four fuel connections and which is rigidly mounted in the casing of the vehicle and can not be interchanged. The disadvantage resides in that the device for temperature responsive switching of overflow quantities, which is very expensive, operates with the valve which is controlled by a float gauge measuring the density of the recycled fuel. A thermostat valve for temperature responsive switching of fuel overflow from the fuel injection pump is connected in series with the above mentioned valve; this however results in the device with considerable hysterisis. Furthermore, a non-throttled passage of the overflow quantities from the fuel injection pump via the switching device and the ventilation device to the tank is often in practice disadvantageous. The cover of the filter with interchangeable components is expensive in manufacture and is not suitable for the filter to be arranged in a conduit between the tank and the injection pump, which could be removed and thrown away and replaced by a new one.

A conduit filter disclosed in GB-PS No. 1,584,517 has a cover provided with a feeding connection and a discharge connection and a cup-shaped housing which accommodates a filter element and is non-releasably connected to the cover, and in which the filter element if contaminated can be interchanged as a whole. This known filter is simple, inexpensive and compact; however it has no temperature responsive switching device and no ventilation device.

From U.S. Pat. No. 4,574,762 a temperature responsive switching device for reversing overflow quantities of a diesel fuel injection pump is known, this device operating hysteresis-free and wear-free. Effective heat of the diesel fuel is utilized to avoid wax crystallization at low temperatures. This device is provided with a bimetallic snapping disc which operates as a movable control member of a reversing valve and has a throttle opening for a continual ventilation, arranged parallel to that control member, and a pressure control valve which is open to the contaminated side of the filter. The known device is accommodated in the housing which is connected to the cover of the filter having interchangeable components by means of hollow bolts. The device is therefore not suitable as a conduit filter which should be compact and disposable.

SUMMARY OF THE INVENTION

It is an object of the present invention to provide an improved filter for diesel fuel.

It is another object of this invention to provide a filter which is compact and can be utilized as a conduit filter to be interconnected between the diesel fuel tank and the diesel fuel injection pump.

These and other objects of the invention are attained by a filter for diesel fuel to be mounted between a diesel fuel tank and a diesel fuel injection pump and comprising a housing accommodating a filter element and provided with a first connection means and a second connection means, said first connection means being a feeding connection connected to the tank and said second connection means being a discharge connection connected to the pump; means for temperature responsive switching heated fuel overflow quantities flowing from said pump to said tank; a third connection means receiving said overflow quantities into the filter; a fourth connection means for unloading the overflow quantities into the tank; and ventilation means for carrying off gas inclusions from said overflow quantities switched to the tank, the improvement comprising said filter being formed as a conduit filter and further including a cover non-releasably connected to said housing, said housing being cup-shaped, said temperature responsive switching means and said ventilation means being integrated with said cover.

The fact that the temperature responsive switching means for switching diesel fuel overflow quantities from the pump back to the tank permits one to create a very compact and simple construction which is easy to assemble. The construction of the filter of this invention allows for the provision of a disposable conduit filter. Filter structural components of the filters known up until now can be utilized with the filter of this invention. Optimal heat transmission or heat deflection on the filter element is obtained due to the arrangement of the device for fuel recycling in the interior of the housing on the cover. Furthermore, effective ventilation under various operation conditions are ensured by the arrangement of the switching and ventilation means on the cover. The position of the temperature responsive means in the chamber makes possible a favorable oncoming flow through the heated overflow quantities and provides for a hysteresis-free operation.

The filter has an axis of elongation, said third and fourth connection means may be positioned substantially in the same radial plane as said feeding connection and said discharge connection as viewed from said axis of elongation.

The filter may further include a separating element rigidly connected to said housing and which forms with said cover a chamber into which said third connection means and said fourth connection means extend, and a pressure control valve open to a contaminated side of the filter element and connecting said chamber to said contaminated side, said chamber accommodating said temperature responsive switching means and said ventilation means.

The cover may be made of relatively thin-walled material, for example sheet steel.

The separating element may be positioned inside said housing, said third and fourth connection means being rigidly mounted immediately in said cover.

The cover may be provided with a formation protruding and curved outwardly away from said housing and of substantially circular cross-section, said separating element being a flat cover plate enclosing with said formation said chamber.

The temperature responsive switching means may be a flow reversing valve including a movable control member formed by a flat bimetallic disc which is in connection with said third and fourth connection means, and a valve seat.

The ventilation means may include a throttle opening which is connected in parallel to said reversing valve between said third connection means and said fourth connection means, said pressure control valve being positioned parallel to said reversing valve between said third connection means and the contaminated side of the filter element.

The fourth connection means may be positioned centrally of said formation, and said third connection means is positioned at an edge of said formation and extends into said chamber obliquely to an axis of elongation of the filter.

Each of said connection means may be a tubular member; the filter further including a sealing ring positioned in said chamber and held by the tubular member of the fourth connection means and said formation, said sealing ring forming said valve seat for the bimetallic snapping disc.

The reversing valve may further include a supporting spring mounted to said cover plate, said housing having a shoulder, said bimetallic disc having an outer edge positioned between said shoulder and said spring.

The pressure control valve may be secured to said cover plate, said pressure control valve being formed by a plate valve.

The throttle opening may be provided centrally of said bimetallic disc.

The discharge connection may be positioned along an axis of elongation of the filter centrally of said cover, said feeding connection and said formation being positioned diametrically opposed to each other relative to an axis of elongation of the filter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a top plan view of the filter of FIG. 1;

FIG. 3 is a sectional view taken along line III—III of FIG. 2; and

FIG. 4 is a switch diagram of the filter of FIG. 1.

DETAILED DESCRIPTION OF THE PREFERRED EMBODIMENT

Figure 1:
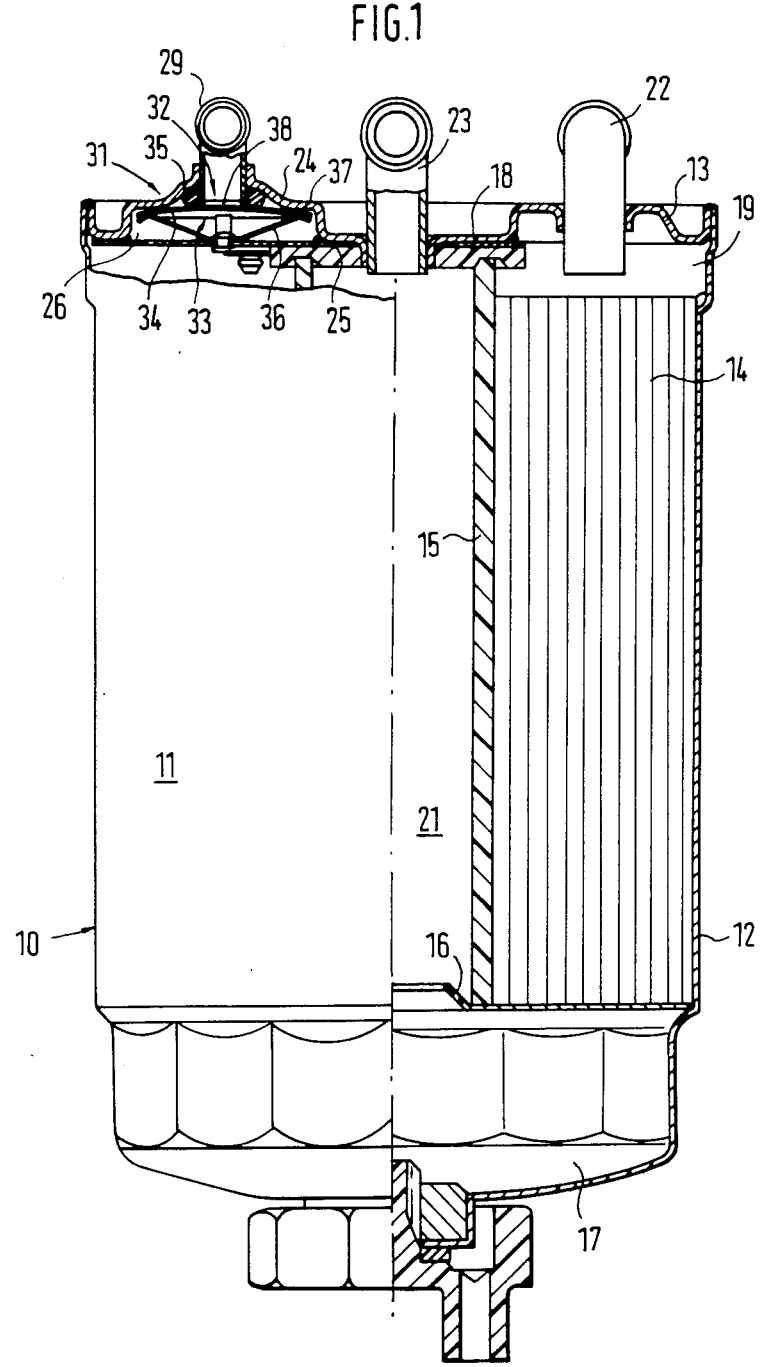
FIG. 1 is an axial view, partially in section, of a filter for diesel fuel according to the present invention.

Referring now to the drawings in detail, and firstly to FIG. 1 thereof, reference numeral 10 designates a filter for diesel fuel, which filter is formed herein as a conduit filter. Filter 10 has a housing 11 which is comprised of a cup-shaped housing portion 12 and a cover 13 which are sealingly welded to each other at their edges.

The housing portion 12 accommodates an axially extended filter element 14 through which a fuel flow passes. Filter element 14 includes a central tube 15 about which a filter paper web is helically wrapped. Central tube 15 has a lower edge which is supported on a supporting plate 16 which in turn is supported with its shoulder in the housing portion 12 above a water storage space 17. A flat gasket ring 18 mounted to the upper edge of central tube 15 serves the purpose of separating a clean side 21 of the filter from its contaminated side 19.

The cover 13 of the conduit filter is formed of a relatively thin-walled steel sheet. A fuel feeding connection 22 and a fuel discharge connection 23 are provided in cover 13. Both connections are formed of angular or curved tubular members adapted to receive hose ends. The fuel discharge connection 23 is secured in cover 13 so that it extends coaxially to the axis of elongation of filter 10 whereas the fuel feeding connection 22 is arranged in cover 13 so that it is radially offset relative to the discharge connection and thus to the filter axis of elongation. Fuel feeding connection 22 is in connection with the contaminated side 19.

Cover 13 is provided with a substantially circular, dome-shaped formation or outwardly projecting portion 24 which is diametrically opposite to the fuel feeding connection 22. A flat and thin cover or separating plate 25, positioned inside the housing 11, is rigidly and fuel-tight connected to cover 13 in the region of formation 24 by means of glue or welding.

As can be further seen from FIG. 1 in connection with FIG. 2, the peripheral shape of the cover plate 25 is selected so that this cover plate forms together with the formation or protruding portion 24 a chamber 26 which is separated from the contaminated side 19. As can be further seen from FIG. 2 in connection with FIG. 3 the protruding portion 24, which has a substantially circular cross-section as mentioned above, has a lateral bulge or projection 27 in which a third connection 28 is secured. A heated-up overflow portion of diesel fuel is fed into the filter through the third connection 28 from a fuel injection pump. This third connection 28 is formed as a bent tube adapted to receive the end of the hose and is arranged in the protruding portion 24 so that the overflow fuel portion fed thereinto enters chamber 26 obliquely at the upper edge of this chamber. Centrally of the protruding portion 24 is provided a fourth fuel connection 29, which also formed as a bent tube to receive the end of the hose. This fourth connection 29 extends in parallel to the tube of the discharge connection 23. Fuel connection 29 is in communication with a tank filled with diesel fuel. As clearly seen from FIG. 1 the third and fourth connections 28 and 29 are positioned in the same radial plane, as referred to the axis of elongation of filter 10, as the feeding connection 22 and discharge connection 23. Thereby a compact design of the filter is attained.

Chamber 26 formed in the cover 13 accommodates a device 31 for a temperature-responsive switching of heated overflow quantities of the fuel fed from the fuel injection pump to a fuel tank as well as a ventilation device 32 for carrying off inclusions of gas from the fuel overflow quantity fed to the tank.

Device 31 is substantially comprised of a reversing valve 33, the movable control member of which is formed by a circular bimetallic snapping ring or disc 34, and the corresponding valve seat of which is formed by a O-ring 35 rigidly connected to the housing. O-ring 35 is held in position by the inner wall of the protruding portion 24 and by an enlarged end of the tube of the fourth connection 29 extended into the chamber 26. A supporting spring 36 secured to the cover plate 25 is supported against the region of the outer rim of the bimetallic disc 34 and urges the latter in the illustrated locked or closed position against the valve seat 35 whereby the bimetallic snapping disc 34 is at its region of the medium diameter in contact with the O-ring 35. The outer edge of the bimetallic snap disc 34 is positioned at a distance from a shoulder 37 of the protruding portion 24. The outer rim of bimetallic disc 34 is thus radially guided in a short cylindrical region of the protruding portion 24.

The ventilation device 32 includes a throttle opening 38 which is formed centrally of the bimetallic disc 34 and is in continual throttle communication with the third connection 28 and the fourth connection 29. The throttle opening 38 is connected in parallel to the reverse valve 33 between the connection 28 and connection 29.

A pressure control valve 39 shown in FIG. 3 is provided on the cover plate 25. This pressure control valve operates to control the connection between chamber 26 and the contaminated side 19 and can open only towards the contaminated side. Pressure control valve 39 is an inexpensively manufactured plate valve, the minimal opening pressure of which amounts to approximately 0.4 bar. As can be seen from FIG. 3 the plate valve 39 as well as the four-arm supporting spring 36 for the bimetallic disc 34 are secured to the cover plate 29 by means of single rivets 42.

FIG. 4 illustrates the switch diagram of the conduit filter 10 of FIG. 1. The like structural components in FIG. 4 are designated by the same reference numbers as those in FIG. 1.

Feeding connection 22 of filter 10 receives diesel fuel from a tank 45. The discharge connection 23 of filter 10 is connected to an inlet 46 of a fuel injection pump 47. An overflow outlet 48 of the pump 47 is connected to the third filter connection 28. A heated fuel overflow portion, entering chamber 26 via the connection 28 can at one time flow through the temperature-responsive reversing valve 33 to the fourth connection 29 and further into tank 45 or in parallel thereto via the pressure control valve 39 to the contaminated side 19 of the filter element 14. Throttle opening 38 as a part of the ventilation device 32 lies between connections 28 and 29 in parallel with the reversing valve 33.

The mode of operation of the filter 10 will be explained below. It should be noted that the main functions of the device 31 for temperature-responsive switching of fuel overflow quantities flowing from the fuel injection pump and the ventilation device are disclosed in the U.S. Pat. No. 4,574,762 of the same assignee.

Diesel fuel flowing from the tank 45 via feeding connection 22 into the filter 10 is filtered in the filter element 14 and then flows, after being separated from water in the water storage space 17, through the discharge connection 23 to the fuel injection pump 47. A warmed-up overflow quantity of fuel is directed from pump 47 to the third connection 28 of filter 10 and therefore into chamber 26. The bimetallic disc 34 is designed so that if the overflow fuel quantity is at the temperature of below about 15° C. the bimetallic disc 34 takes the locked position shown in FIG. 1 whereby supporting spring 36 presses bimetallic disc 34 against the O-ring 35 and thus locks the connection towards tank 45. The fuel overflow quantity that is fed into chamber 26 via third connection 28 and obliquely relative to the axis of this chamber is directed immediately on the bimetallic disc 34 so that heat conducted by the overflow quantity is rapidly transmitted to all sides of the wetted bimetallic disc 34. When reversing valve 33 is closed a greater portion of the fuel overflow quantity flows through the open pressure control valve 39 to the contaminated side 19 of filter 10 and is mixed there with the cold fuel sucked out from the fuel containing tank 45 whereby wax crystallization in the filter element 14 at lower temperatures would be avoided.

If the reversing valve is closed a smaller portion of the fuel overflow quantity continuously flows via the throttle opening 38 to the tank 45 whereby an unobjectionable ventilation under various operation conditions is obtained.

If a fuel overflow quantity fed from fuel injection pump 47 into chamber 26 reaches the temperature of, for example 40° C. the bimetallic disc 34, which becomes slightly curved, moves away from the illustrated locked position to an open position and the middle region of this disc is lifted away from the O-ring 35 whereby the connection between the third connection 28 and the fourth connection and therefore towards tank 45 is released. The outer rim of the curved bimetallic disc 34 in this opening position now abuts against the shoulder 37 due to the force of the supporting spring 36. Despite such a position a sufficient amount of fuel flow which enters the protruding formation 24 through the projection 27 is produced between the connection 28 and connection 29. At the same time the bimetallic disc 34 is guided in the cylindrical region of the formation 24.

The plate valve 39 in case of a low opening pressure prevents air from an empty tank from flowing into the filter element. At the same time valve 39 prevents air conveyed by the overflow quantities from entering the contaminated side 19 of the filter 10.

The device for temperature-responsive switching of fuel overflow quantities of a fuel injection pump as well as the ventilation device are integrated in a simple, compact and inexpensive manner in the conduit filter. Optimal heat transmission or heat reflection to the filter element 14 is obtained in filter 10 due to such a compact construction. A particularly compact reversing valve 33 with the bimetallic disc provides a fuel recycling in cover 13 of filter 10 without requiring an additional space whereby all the fuel connections can be arranged substantially in the same radial plane.

It will be understood that each of the elements described above, or two or more together, may also find a useful application in other types of filters for diesel fuel differing from the types described above.

While the invention has been illustrated and described as embodied in a filter for diesel fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conduit filter for diesel fuel to be mounted between a diesel fuel tank and a diesel fuel injection pump and comprising a housing accomodating a filter element; a first connection means and a second connection means, said first connection means being a feeding connection to the tank and said second connection means being a discharge connection connecte to the pump; means for temperature-responsive switching of heated fuel overflow quantities flowing from said pump to said tank; a third connection means receiving said overflow quantities into the filter; a fourth connection means for unloading the overflow quantities into the tank; said filter having an axis of elongation, said third and fourth connection means being positioned substantially in the same radial plane as said feeding connection and said discharge connection as viewed from said axis of elongation; ventilation means for carrying off gas inclusions from said overflow quantities being switched to the tank; a cover non-releasably connected to said housing and accommodating said first and second connection means, said housing being cupshaped, said temperature-responsive switching means and said ventilation means being integrated with said cover; a separating element rigidly connected to said housing and forming with said cover a chamber into which said third connection means and said fourth connection means extend; and a pressure control valve open to a contaminated side of the filter element and connecting said chamber to said contaminated side, said chamber accommodating said temperature-responsive switching means and said ventilation means, said separating element being positioned inside said housing, said third and fourth connection means being rigidly mounted immediately in said cover, said cover being made of relatively thin-walled material and being provided with a formation protruding and curved outwardly away from said housing and of substantially circular cross-section, said separating element being a flat cover plate enclosing with said formation said chamber, said temperature responsive switching means being a flow reversing valve including a movable control member formed by a flat bimetallic disc which is in connection with said third and fourth connection means, and a valve seat.

2. The filter as defined in claim 1, wherein said cover is made of sheet steel.

3. The filter as defined in claim 1, wherein said ventilation means includes a throttle opening which is connected in parallel to said reversing valve between said third connection means and said fourth connection means, said pressure control valve being positioned parallel to said reversing valve between said third connection means and the contaminated side of the filter element.

4. The filter as defined in claim 3, wherein said fourth connection means is positioned centrally of said formation and said third connection means is positioned at an edge of said formation and extends into said chamber obliquely to the axis of elongation of the filter.

5. The filter as defined in claim 4, wherein each of said connection means is a tubular member; the filter further including a sealing ring positioned in said chamber and held by the tubular member of the fourth connection means and said formation, said sealing ring forming said valve seat for the bimetallic snapping disc.

6. The filter as defined in claim 3, wherein said throttle opening is provided centrally of said bimetallic disc.

7. The filter as defined in claim 1, wherein said reversing valve further includes a supporting spring mounted to said cover plate, said housing having a shoulder, said bimetallic disc having an outer edge positioned between said shoulder and said spring.

8. The filter as defined in claim 1, wherein said pressure control valve is secured to said cover plate, said pressure control valve being formed by a plate valve.

9. The filter as defined in claim 1, wherein said discharge connection is positioned along the axis of elongation of the filter centrally of said cover, said feeding connection and said formation being positioned diametrically opposed to each other relative to the axis of elongation of the filter.

* * * * *